(12) United States Patent
Gupta et al.

(10) Patent No.: US 12,036,987 B2
(45) Date of Patent: Jul. 16, 2024

(54) STUDENT-T PROCESS PERSONALIZED ADAPTIVE CRUISE CONTROL (71) Applicant: Toyota Motor Engineering & Manufacturing North America, Inc., Plano, TX (US)

(72) Inventors: Rohit Gupta, Santa Clara, CA (US); Yanbing Wang, Nashville, TN (US); Ziran Wang, San Jose, CA (US); Kyungtae Han, Palo Alto, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 300 days.

(21) Appl. No.: 17/388,488

(22) Filed: Jul. 29, 2021

(65) Prior Publication Data
US 2023/0035228 A1 Feb. 2, 2023

(51) Int. Cl.
*B60W 30/16* (2020.01)
*G05B 13/02* (2006.01)
(Continued)

(52) U.S. Cl.
CPC ......... *B60W 30/16* (2013.01); *G05B 13/0265* (2013.01); *G05B 13/048* (2013.01); *G06Q 30/0201* (2013.01); *G07C 5/008* (2013.01); *B60W 2520/10* (2013.01); *B60W 2540/30* (2013.01); *B60W 2552/05* (2020.02); *B60W 2552/35* (2020.02); *B60W 2552/40* (2020.02); *B60W 2554/40* (2020.02);
(Continued)

(58) Field of Classification Search
CPC . B60W 30/16; G05B 13/0265; G05B 13/048; G06Q 30/0201; G07C 5/008
See application file for complete search history.

(56) References Cited

U.S. PATENT DOCUMENTS 10,183,679 B2 * 1/2019 Huber ................... B60W 40/09
10,408,638 B2 9/2019 Berntorp et al.
(Continued)

FOREIGN PATENT DOCUMENTS

JP 2020126058 A 8/2020

OTHER PUBLICATIONS

Brendan D. Tracey, et al., "Upgrading from Gaussian Processes to Student's-T Processes", 2018 AIAA Non-Deterministic Approaches Conference, Jan. 7, 2018, URL: https://arc.aiaa.org/doi/10.2514/6. 2018-1659.
(Continued)

*Primary Examiner* — Peter D Nolan
*Assistant Examiner* — Mikko Okechukwu Obioha
(74) *Attorney, Agent, or Firm* — Dinsmore & Shohl LLP (57) ABSTRACT

A vehicle includes a controller programed to: collect a set of data related to a driver of the vehicle; predict a driving setting for the driver using the set of data and an initial student-T process (STP) machine learning (ML) model; generate an updated STP ML model based on the prediction of the driving setting as to the set of vehicle data; transmit incremental learning related to the updated STP ML model to a server; and receive, from the server, a personalized driving setting for the driver output from a cloud STP ML model trained by the incremental learning.

20 Claims, 8 Drawing Sheets

(51) Int. Cl.
*G05B 13/04* (2006.01)
*G06Q 30/0201* (2023.01)
*G07C 5/00* (2006.01)

(52) U.S. Cl.
CPC . *B60W 2554/802* (2020.02); *B60W 2554/804* (2020.02); *B60W 2555/20* (2020.02); *B60W 2556/45* (2020.02)

(56) References Cited

U.S. PATENT DOCUMENTS

2019/0308619 A1* 10/2019 Rosenbaum ......... G05D 1/0088
2020/0278685 A1 9/2020 Jang et al.
2022/0101112 A1* 3/2022 Brown .................... G10L 15/18

OTHER PUBLICATIONS

Amar Shah, et al., "Student-t Processes as Alternatives to Gaussian Processes", Proceedings of the Seventeenth International Conference on Artificial Intelligence and Statistics, PMLR, Apr. 2014, vol. 33, pp. 877-885, URL: http://proceedings.mlr.press/v33/shah14.html.

* cited by examiner

STUDENT-T PROCESS PERSONALIZED ADAPTIVE CRUISE CONTROL

TECHNICAL FIELD

The present disclosure relates to systems and methods for generating personalized adaptive cruise control using Student-T Process.

BACKGROUND

Adaptive cruise control (ACC) is being developed and deployed on passenger vehicles due to its promise to enhance driver convenience, traffic flow, and fuel economy. ACC is a multifaceted control problem because it involves asymptotic performance objectives (drive at a desired speed), subject to constraints (maintain a distance from the car in front of you), and constraints based on the physical characteristics of a vehicle and road surface (maximum acceleration and deceleration). These control problems become more challenging by the fact that the various objectives can often be in conflict, such as when the desired speed of the vehicle is faster than the speed of a leading vehicle.

The acceleration or speed profile of the leading vehicle is time-series data, and it can be estimated using data learning methods and that Gaussian processes could describe the acceleration or speed profile of the leading vehicle. However, Gaussian processes suffer significant drawbacks. Outliers are assumed to be unlikely, due to the low kurtosis of Gaussian distribution, and a posterior variance depends only on the observed locations, not the observed function values.

Accordingly, a need exists for data learning methods that address the disadvantages of Gaussian processes.

SUMMARY

The present disclosure provides systems and methods for generating personalized adaptive cruise control using student-T processes.

In one embodiment, a vehicle includes a controller programed to: collect a set of data related to a driver of the vehicle; predict a driving setting for the driver using the set of data and an initial student-T process (STP) machine learning (ML) model; generate an updated STP ML model based on the prediction of the driving setting as to the set of vehicle data; transmit incremental learning related to the updated STP ML model to a server; and receive, from the server, a personalized driving setting for the driver output from a cloud STP ML model trained by the incremental learning.

In another embodiment, a method for generating a personalized driving setting using a STP ML model is provided. The method includes collecting a set of data related to a driver of a vehicle; predicting a driving setting for the driver using the set of data and an initial STP ML model; generating an updated STP ML model based on the prediction of the driving setting as to the set of vehicle data; transmitting incremental learning related to the updated STP ML model to a cloud; and receiving, from the server, a personalized driving setting for the driver output from a cloud STP ML model trained by the incremental learning.

In another embodiment, a system for generating a personalized driving setting using an STP ML model is provided. The system includes a vehicle and a server. The vehicle is programed to: collect a set of data related to a driver of the vehicle; predict a driving setting for the driver using the set of data and an initial STP ML model; generate an updated STP ML model based on the prediction of the driving setting as to the set of vehicle data; and transmit incremental learning related to the updated STP ML model to a server. The server is programed to train a cloud STP ML model based on the incremental learning and transmit, to the vehicle, a personalized driving setting for the driver based on the trained cloud STP ML model.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for obtaining a personalized adaptive cruise control (ACC) using Student-T Process (STP). Gaussian Process (GP) has sampling problems where GP works with a given sample of data, but does not work with the next sample of data. In order to address this issue, one must increase the data sampling size, which increases the cost of training the data set. In contrast, STP works with a smaller sample size and thus can replace GP. In addition, STP can catch outliers that GP cannot catch. This improves the personalized ACC in real-life driving situations where drivers often over-speed or brake suddenly, and do not let the ACC system work as intended.

The embodiments disclosed herein use STP in the form of a car-following model to model the personalized longitudinal acceleration. An STP model plays a role as an upper-level longitudinal controller, which determines a desired acceleration or desired time gap for the vehicle.

In embodiments, a vehicle includes a controller programed to collect a set of data related to a driver of the vehicle, predict a driving setting for the driver using the set of data and an initial student-T process (STP) machine learning (ML) model, generate an updated STP ML model based on the prediction of the driving setting as to the set of vehicle data, transmit incremental learning related to the updated STP ML model to a cloud server, and receive, from the cloud server, a personalized setting for the driver output from another STP ML model trained by the incremental learning. The personalized setting designs an ACC that resembles naturalistic human driving as closely as possible. The personalized setting may be employed to enhance advanced driver assistance systems and personalized autonomous driving.

Figure 1:
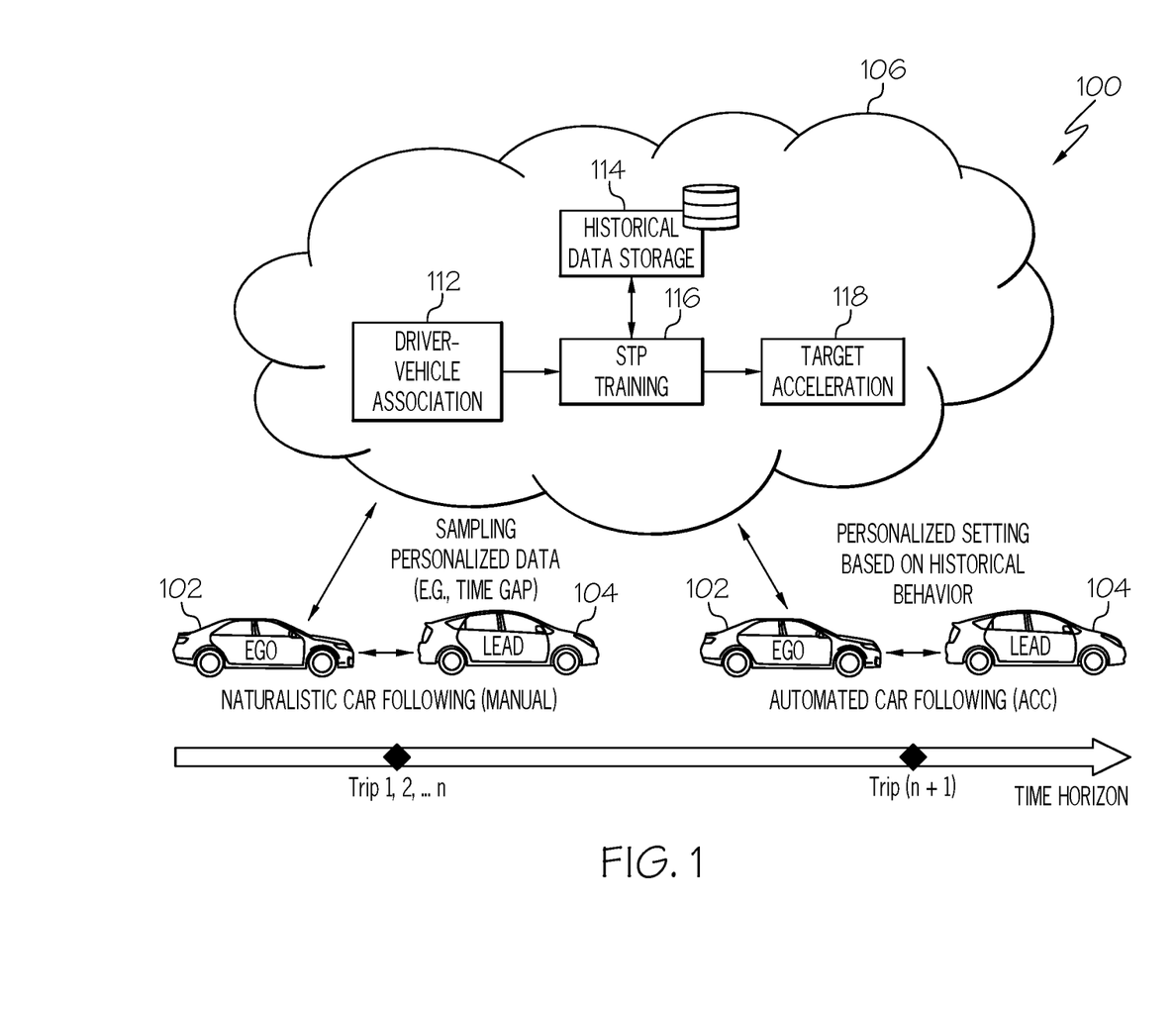
FIG. 1 schematically depicts a system for training an adaptive cruise control (ACC) of an ego vehicle with a Student-T Process (STP) machine learning (ML) model using data from the ego vehicle during a manual driving, in accordance with one or more embodiments shown and described herewith.

FIG. 1 schematically depicts a system for training an adaptive cruise control (ACC) of an ego vehicle with a Student-T Process (STP) machine learning (ML) model using data from the ego vehicle during a manual driving, in accordance with one or more embodiments shown and described herewith.

In embodiments, during trips 1 through N, the sampling of personalized data related to an ego vehicle 102 is transmitted from the ego vehicle 102 to a cloud server 106. The personalized data may include a time gap between the ego vehicle 102 and a lead vehicle 104, the acceleration of the ego vehicle 102, a distance between the ego vehicle 102 and the lead vehicle 104, the velocity of the ego vehicle 102, and the velocity of the lead vehicle 104. The personalized data may also include identification information about the ego vehicle, identification information about the lead vehicle 104, and/or current location of the ego vehicle. The personalized data represents naturalistic car following behavior of the ego vehicle 102. In some embodiments, the personalized data may also include contextual information such as weather information, a type of the road on which the ego vehicle 102 is driving, a surface condition of the road on which the ego vehicle 102 is driving, and a degree of traffic on the road on which the ego vehicle 102 is driving.

The cloud server 106 may train a personalized setting for the driver of the ego vehicle 102 with an STP ML model 116 using the personalized data from the ego vehicle 102. The cloud server 106 may store driver-vehicle association 112 so that the cloud server 106 may identify the driver of the ego vehicle 102 based on the personalized data from the ego vehicle 102. The cloud server 106 may include a historical data storage 114 that stores historical driving data for different drivers. For example, the historical data storage 114 stores driving data for the ego vehicle 102 for trips 1 through n. The driving data may correspond to the sampling of the personalized data received from the ego vehicle 102. The trained personalized setting may output desired parameters 118 such as a desired acceleration or a desired time gap between the ego vehicle 102 and the lead vehicle 104.

In embodiments, the cloud server 106 may implement fine-tuning, error correction, and aggregation on the personalized data collected during trips 1 through N. The adjusted personalized data may be downloaded to the ego vehicle 102 in a future trip.

During a future trip, for example, trip n+1, the ego vehicle 102 may download the trained personalized setting or parameters from the cloud server 106. The ego vehicle 102 then uses the new trained personalized setting or parameters downloaded from the cloud server 106 as guidance. The personalized setting or parameters may be a personalized STP ML model for the ego vehicle 102. The personalized STP ML model receives the measured gap between the ego vehicle 102 and the lead vehicle 104 and the speeds of the ego vehicle 102 and the lead vehicle 104 as inputs, and outputs a target parameter such as a target acceleration of the ego vehicle 102, a target gap between the ego vehicle 102 and the lead vehicle 104. In this regard, during trip n+1, the ego vehicle 102 resembles naturalistic human driving that was conducted during trips 1 through n as closely as possible.

As the ego vehicle 102 continues to do more trips, the ego vehicle 102 continues to calculate new parameters (e.g., gap preference, acceleration profile) through incremental learning and an updated STP ML model representing the parameters is uploaded to the cloud server 106. The cloud server 106 may update its aggregated STP ML model if there is a change from new data.

Figure 2:
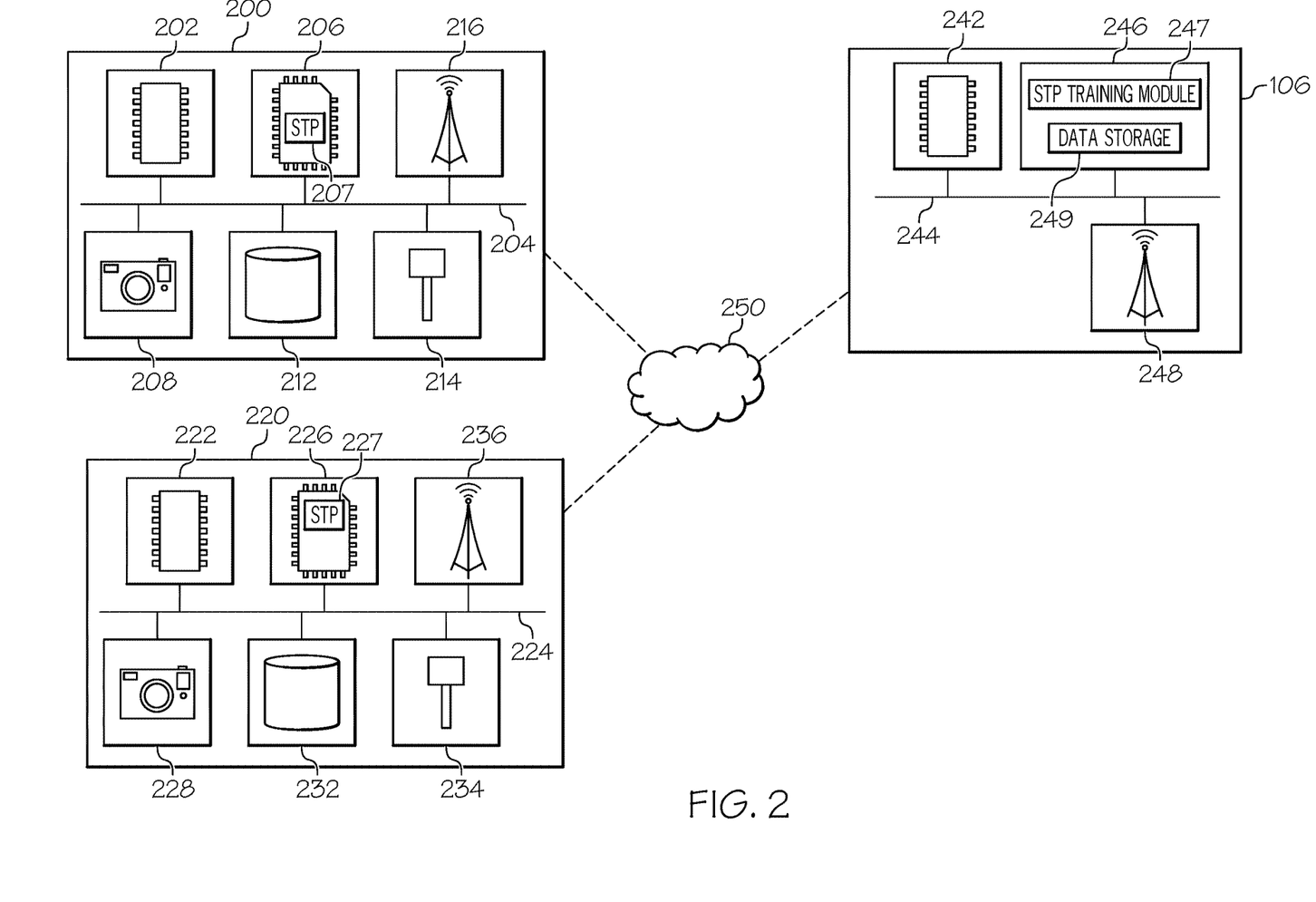
FIG. 2 depicts a schematic diagram of a system for training an adaptive cruise control (ACC) of an ego vehicle with a Student-T Process (STP) machine learning (ML) model, according to one or more embodiments shown and described herein.

FIG. 2 depicts a schematic diagram of a system for training an adaptive cruise control (ACC) of an ego vehicle with a Student-T Process (STP) machine learning (ML) model, according to one or more embodiments shown and described herein. The system includes an ego vehicle system 200, a lead vehicle system 220, and the cloud server 106.

It is noted that, while the ego vehicle system 200 and the lead vehicle system 220 are depicted in isolation, each of the ego vehicle system 200 and the lead vehicle system 220 may be included within a vehicle in some embodiments, for example, respectively within each of the ego vehicle 102 and the lead vehicle 104 of FIG. 1. In embodiments in which each of the ego vehicle system 200 and the lead vehicle system 220 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The ego vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The ego vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 202 along with the one or more memory modules 206 may operate as a controller for the ego vehicle system 200.

The one or more memory modules 206 includes a Student-T Process (STP) model module 207. The STP model module 207 may operate as a part of an advanced driver-assistance system (ADAS) including adaptive cruise control. The STP model module 207 may be a program module in the form of operating systems, application program modules, and other program modules stored in one or more memory modules 206. In some embodiments, the program module may be stored in a remote storage device that may communicate with the ego vehicle system 200, for example, in the cloud server 106. Such a program module may include, but is not limited to, routines, subroutines, programs, objects, components, data structures, and the like for performing specific tasks or executing specific data types as will be described below.

Figure 3:
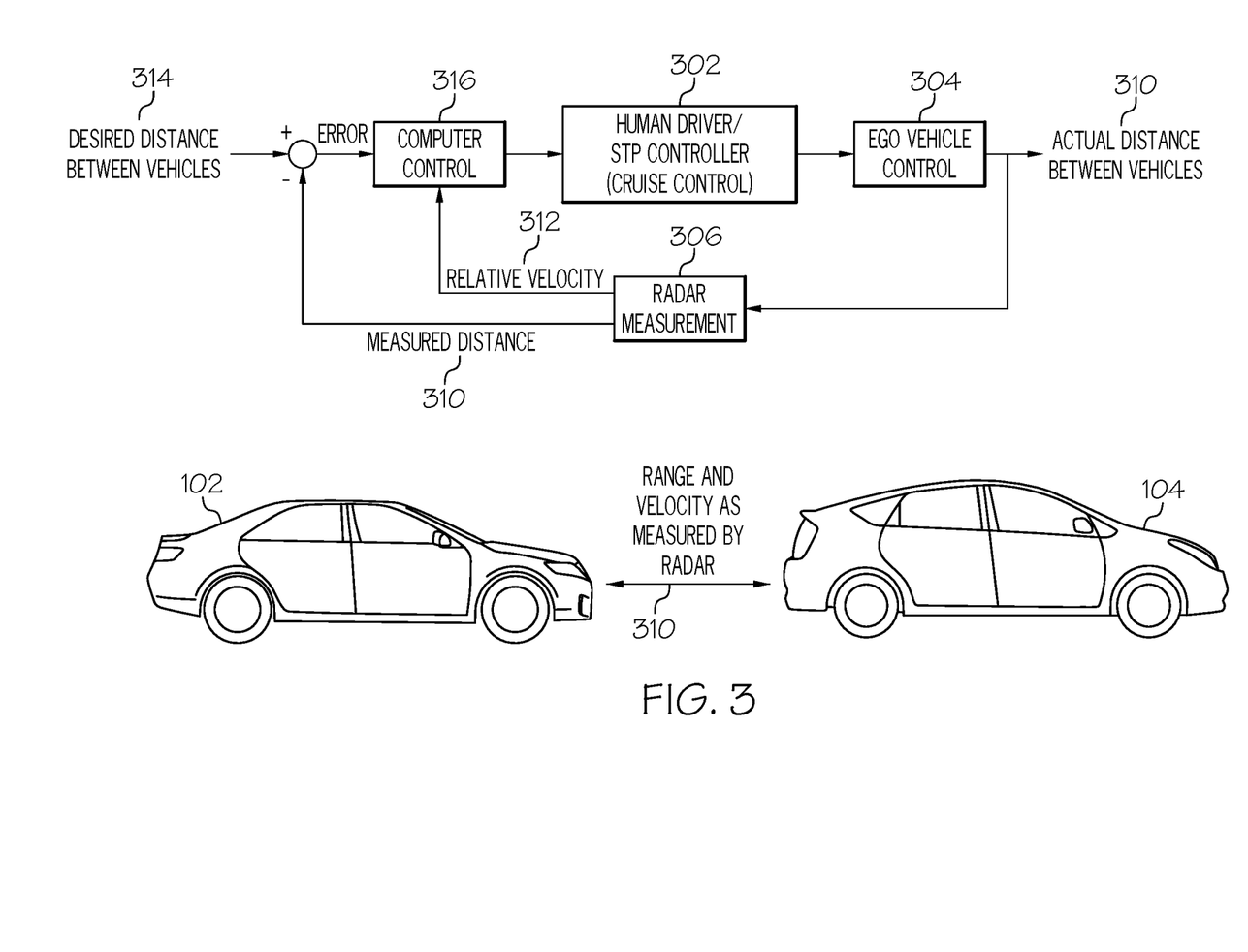
FIG. 3 depicts a schematic diagram for operating an ACC of an ego vehicle, according to one or more embodiments shown and described herein.

The STP model module 207 outputs a target driving parameter, such as a target acceleration or a target gap between the ego vehicle and the lead vehicle. Specifically, by referring to FIG. 3, the ego vehicle 102 may measure a distance 310 between the ego vehicle 102 and the lead vehicle 104 and a relative velocity 312 of the ego vehicle 102 with respect to the lead vehicle 104 using sensors such as radar sensors 306. The difference between the measured distance 310 and a desired distance 314 and the relative velocity 312 are provided to a computer control system 316 that in turn transmits the information to the STP controller 302. Then, the STP controller 302 outputs a target acceleration and/or a target gap for the ego vehicle control 304 and controls the ego vehicle 102. The computer control system 316 and the STP controller 302 in combination may be parts of the STP model module 207. During a manual operation by the driver of the ego vehicle 102 without ACC, the STP model module 207 may collect the operation data, learn the driver's behavior, and update the STP model based on the learning.

The STP model module 207 generates a personalized ACC using Student-T Process on collected data. STPs have marginal distributions described by the multivariate Student's T distribution.

The multivariate Student's-T distribution is a generalization of the multivariate Gaussian distribution with an additional parameter, v, describing the degrees of freedom of the distribution. The probability density is given by Equation 1 below.

$$\tau(\mu, \Sigma, v)(y) = \frac{\Gamma((v+d)/2)}{\Gamma(v/2) v^{d/2} \pi^{d/2} |\Sigma|^{1/2}} \left(1 + \frac{1}{v}(y-\mu)^T \Sigma^{-1} (y-\mu)\right)^{-(v+d)/2}$$

Equation 1 where d is the dimension of the distribution, μ is a location parameter, Σ is a symmetric positive definite shape parameter, and >2 is the degrees of freedom. Like in a Gaussian distribution, v is the mean (and mode) of the distribution.

Referring still to FIG. 2, the ego vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may detect the distance between the ego vehicle 102 and the lead vehicle 104. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate the ego vehicle 102.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain a rough depth and speed information for the view of the ego vehicle system 200.

The ego vehicle system 200 comprises a satellite antenna 214 coupled to the communication path 204 such that the communication path 204 communicatively couples the satellite antenna 214 to other modules of the ego vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The ego vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the ego vehicle 102. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the ego vehicle system 200 comprises network interface hardware 216 for communicatively coupling the ego vehicle system 200 to the lead vehicle system 220 and/or the server 106. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the ego vehicle system 200 may transmit its data to the lead vehicle system 220 or the server 106. For example, the network interface hardware 216 of the ego vehicle system 200 may transmit vehicle data, location data, STP ML data and the like to the server 106.

The ego vehicle system 200 may connect with one or more external vehicle systems (e.g., the lead vehicle system 220) and/or external processing devices (e.g., the cloud server 106) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the ego vehicle system 200 may be communicatively coupled to the cloud server 106 by the network 250. In one embodiment, the network 250 may include one or more computer networks (e.g., a personal area network, a local area network, or a wide area network), cellular networks, satellite networks and/or a global positioning system and combinations thereof. Accordingly, the ego vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the cloud server 106 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The one or more memory modules 246 may include an STP training module 247 and a data storage 249.

The STP training module 247 trains a cloud STP ML model in the cloud server. The STP training module 247 trains the cloud STP ML model using naturalistic driving data collected from vehicles. The naturalistic driving data may be stored in the data storage 249 in association with the identification information of the driver of the corresponding vehicle. The training of the STP cloud model is implemented by minimizing the difference between predicted acceleration and the recorded naturalizing driving acceleration by the driver.

Still referring to FIG. 2, the lead vehicle system 220 includes one or more processors 222, one or more memory modules 226, one or more sensors 228, one or more vehicle sensors 232, a satellite antenna 234, and a communication path 224 communicatively connected to the other components of the lead vehicle system 220. The components of the lead vehicle system 220 may be structurally similar to and have similar functions as the corresponding components of the ego vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204), the network interface hardware 236 corresponds to the network interface hardware 216, and the STP model module 227 corresponds to the STP model module 207.

Figure 4:
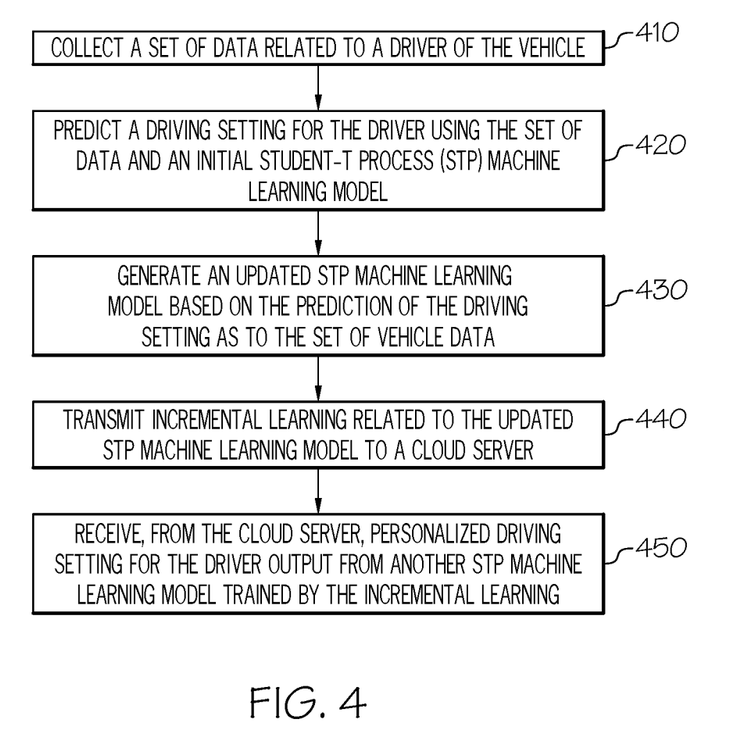
FIG. 4 depicts a flowchart for obtaining personalized parameters for ACC of the ego vehicle based on incremental learning, according to one or more embodiments shown and described herein.

FIG. 4 depicts a flowchart for obtaining personalized parameters for ACC of the ego vehicle based on incremental learning, according to one or more embodiments shown and described herein.

In step 410, an ego vehicle collects a set of data related to a driver of the vehicle. For example, by referring to FIG. 5, for a certain duration of a trip, the ego vehicle 102 collects a set of data such as a space gap between the ego vehicle 102 and a lead vehicle 104, the acceleration of the ego vehicle 102, the velocity of the ego vehicle 102, the velocity of the lead vehicle 104. The data may also include contextual information such as weather information, a type of the road on which the ego vehicle 102 is driving, a surface condition of the road on which the ego vehicle 102 is driving, and a degree of traffic on the road on which the ego vehicle 102 is driving. In some embodiments, the ego vehicle 102 may also collect a space gap between the ego vehicle 102 and a first follower 502, the velocity of the first follower 502.

Referring back to FIG. 4, in step 420, the ego vehicle may predict a driving setting for the driver using the set of data and an initial student-T process (STP) machine learning model. The predicted driving setting may include the acceleration of the ego vehicle, the gap between the ego vehicle and the lead vehicle, and the like. The set of data that is used for predicting the driving setting may be relatively small compared to data for another ML process such as Gaussian Process. For example, the sample size of the set of data may be less than 30 for STP.

In step 430, the ego vehicle may generate an updated STP machine learning model based on the prediction of the driving setting as to the set of data. In embodiments, the STP model module 207 of the ego vehicle system 200 may generate an updated STP machine learning model based on the prediction of the driving setting as to the set of vehicle data. Specifically, the STP model module 207 of the ego vehicle system 200 may generate the updated STP machine learning model by minimizing the difference between the predicted driving setting and the set of data. The updated STP machine learning model may be generated based on incremental learning on the set of data that is obtained during a relatively short period of time of driving. The incremental learning represents a dynamic technique of supervised learning and unsupervised learning that may be applied when training data becomes available gradually over time or its size is out of system memory limits. Algorithms that can facilitate incremental learning are known as incremental machine learning algorithms. Many machine learning algorithms may be used for incremental learning. Incremental learning algorithms may include decision trees, decision rules, artificial neural networks or the incremental SVM. Because Student-T Process works with a relatively small sample size, incremental learning is effective and reliable for updating the STP ML model.

In step 440, the ego vehicle may transmit incremental learning related to the updated STP machine learning model to a cloud server. By referring to FIG. 5, the ego vehicle 102 may transmit the incremental learning 510 to the cloud server 106. In embodiments, the ego vehicle 102 may transmit the initial STP ML model and the updated STP ML model to the cloud server 106. The cloud server 106 may update a cloud STP ML model associated with the driver of the ego vehicle 102 based on the initial STP ML model and the updated STP ML model to improve accuracy of personalized parameters for the driver of the ego vehicle 102. The historical data storage 114 of the cloud server 106 may store historical data related to the initial STP ML model and the updated STP ML model. The cloud server 106 may update the cloud STP ML model associated with the driver of the ego vehicle 102 using incremental learning from a plurality of connected vehicles driving in a similar environment. For example, the cloud server 106 may receive incremental learning from a plurality of connected vehicles in a certain area on a highway under certain conditions (e.g., rainy day at a temperature of 40 degrees Fahrenheit), and update the cloud STP ML model associated with the driver of the ego vehicle 102 based on a weighted sum of incremental learning from the plurality of connected vehicles. In some embodiments, the cloud server 106 may maintain a global STP ML model based on big data from multiple connected vehicles in multiple trips. Then, the cloud server 106 may guide the ego vehicle 102 of what the gap preferences, the acceleration profile to use in new situations by transmitting parameters based on the global STP ML model.

In step 450, the ego vehicle may receive, from the cloud server, a personalized driving setting for the driver output from another STP machine learning model trained by the incremental learning. In embodiments, by referring to FIG. 5, the cloud server 106 may transmit personalized parameters for the ego vehicle 102. The personalized parameters for the vehicle may include a desired acceleration, a desired gap, and the like. In some embodiments, the personalized parameters for the ego vehicle 102 may be parameters for the STP ML model of the ego vehicle 102 such that the STP ML model of the ego vehicle 102 is updated. The parameters for the ego vehicle 102 may be used as guidance for the ego vehicle 102.

Figure 5:
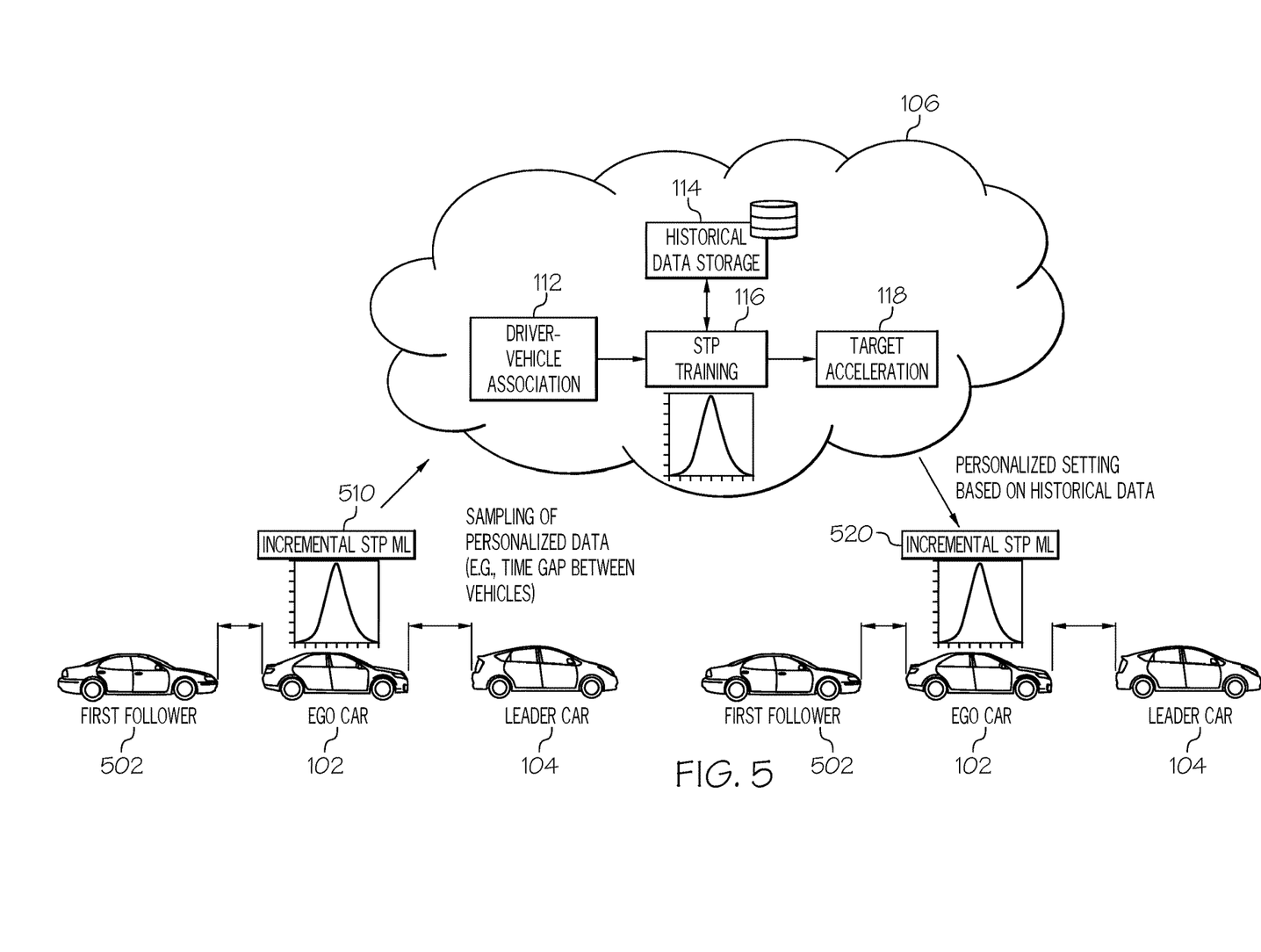
FIG. 5 depicts an incremental STP learning process by an ego vehicle, according to one or more embodiments shown and described herein.

During future trips, the ego vehicle 102 may update the personalized parameters over time to adapt to different driving preferences and scenarios. For example, if the driver of the ego vehicle 102 cancels the STP ML model based ACC, slows down, and increases a time gap under a certain condition (e.g., driving on a poor conditioned road, driving while raining, driving at night, etc.), then the ego vehicle 102 may update the personalized time gap to be longer when driving under similar conditions. The ego vehicle 102 may update personalized parameters or the updated STP ML model to the cloud server 106. The updating process may repeat as the ego vehicle 102 continues to travel.

In some embodiments, the vehicle based STL ML model may calculate a local minimum from a small set of data. The cloud based STP ML model may go through a second loop and find a global minimum of the data set. This addresses the limitation of GP based model.

Figure 6A:
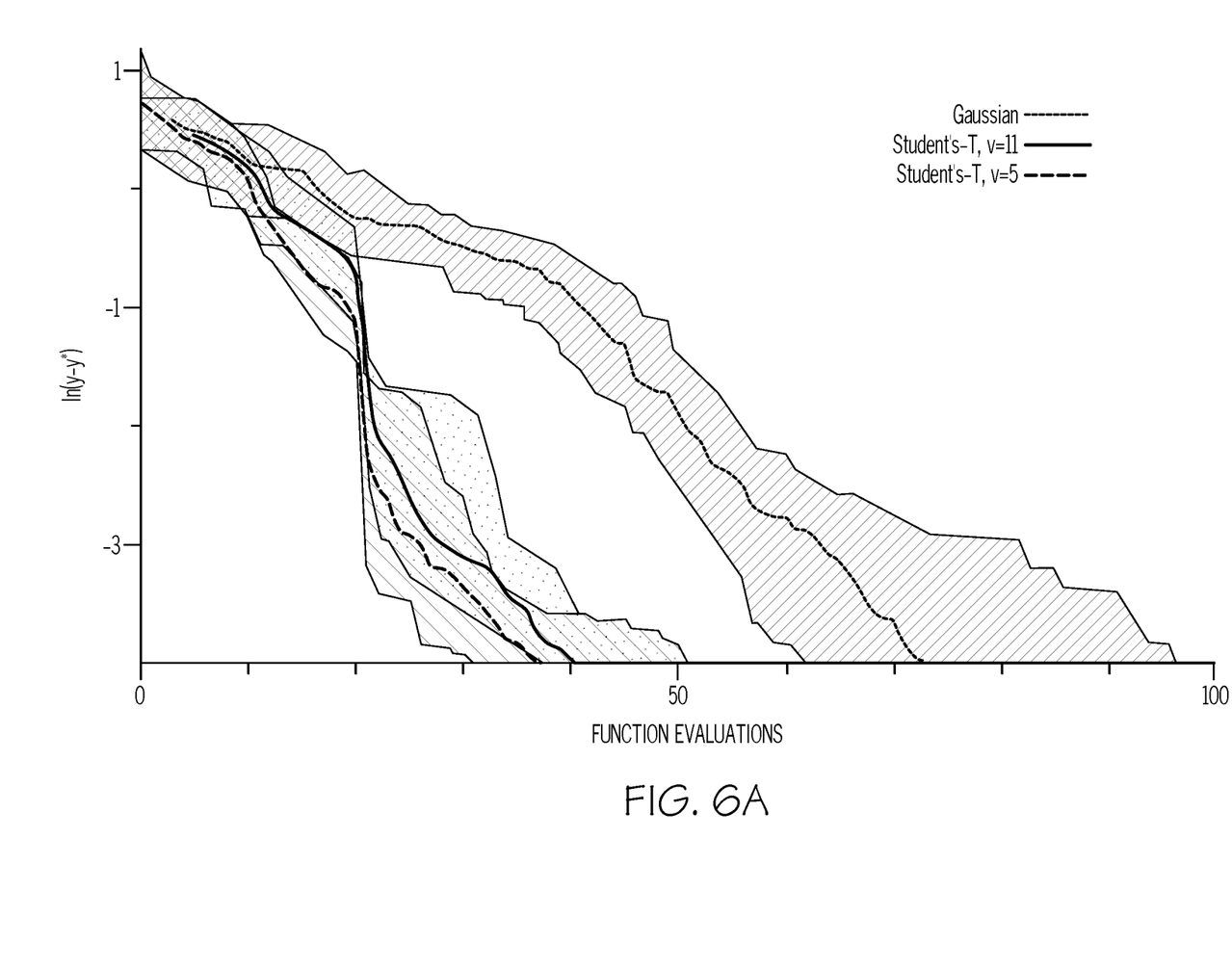
FIG. 6A depicts a graph comparing the performance on the Rosenbrock test case for Gaussian Process, Student's-T Process (v=11), and Student's-T Process (v=5), according to one or more embodiments shown and described herein.

FIG. 6A compares the performance on the Rosenbrock test case for three processes: Gaussian Process, Student's-T Process (v=11), and Student's-T Process (v=5). The y-axis shows the log of the difference between the current best-found value and the global optimum y*, with difference capped at a minimum of $10^{-4}$. The x axis shows how the average of this value changes as a function of the optimization step. The shaded region shows the inner qualities of performance over the 100 runs, and the solid line depicts the median performance.

Figure 6B:
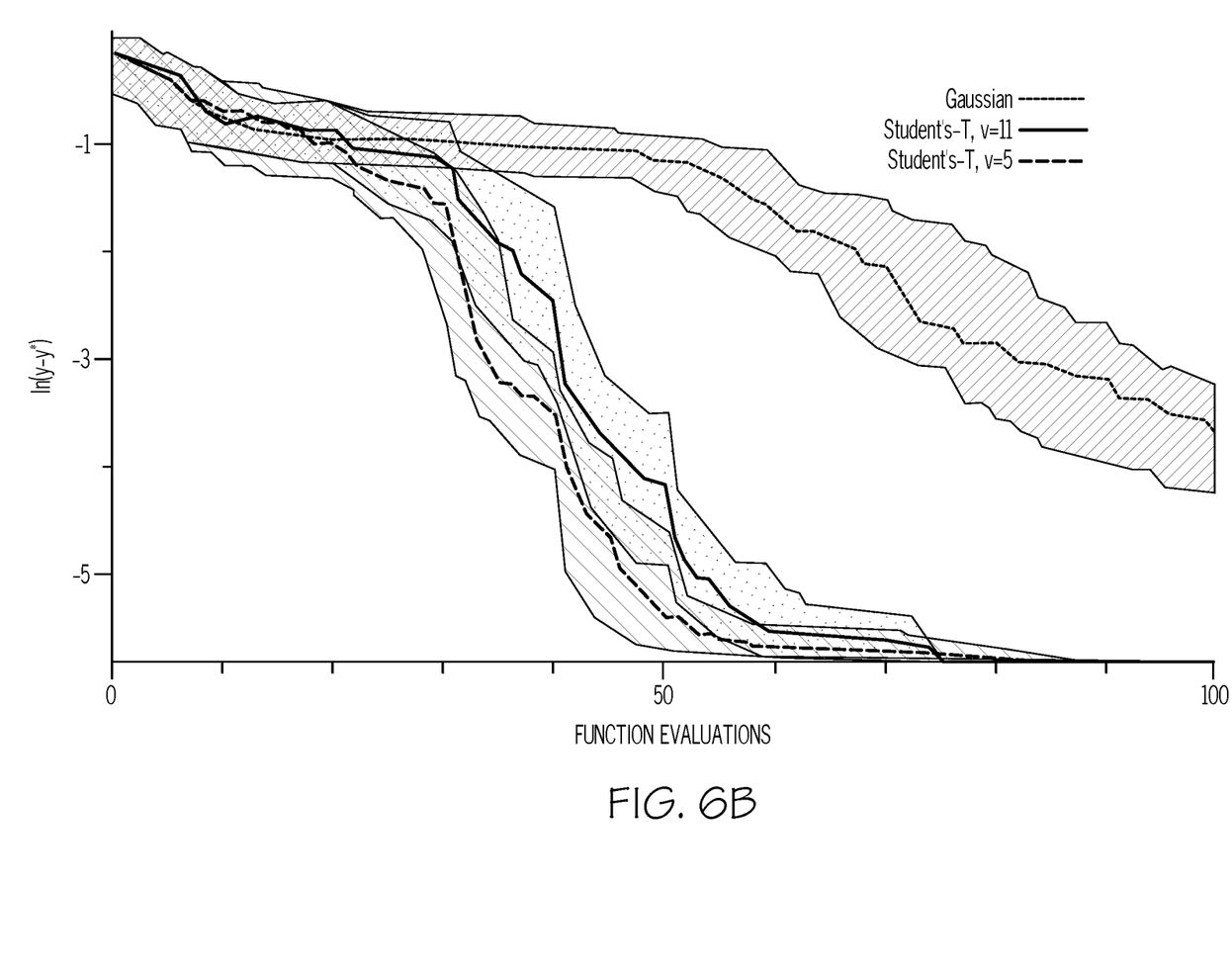
FIG. 6B depicts a graph comparing the performance on the six-hump camel test case for Gaussian Process, Student's-T Process (v=11), and Student's-T Process (v=5), according to one or more embodiments shown and described herein.

FIG. 6B shows the performance on the six-hump camel test case. While all three processes find a significantly better value than the initial seeding, both STPs (v=11 and v=5) significantly outperform Gaussian Process. As illustrated in FIGS. 6A and 6B, both STPs find a better final value, and home in one the optimum earlier optimization. The STPs are significantly more robust. Nearly all the runs of the STP runs find the global minimum within the allotted budget, while in many cases the GP fails to find the best input. This is especially true for the six-hump camel function which contains many local minima, exactly the case where Bayesian optimization is most appropriate. The STP with v=5 seems to outperform the STP with v=11, although the differences are minor compared with the differences with the GP.

It should be understood that embodiments described herein are directed to a vehicle including a controller programed to: collect a set of data related to a driver of the vehicle; predict a driving setting for the driver using the set of data and an initial student-T process (STP) machine learning (ML) model; generate an updated STP ML model based on the prediction of the driving setting as to the set of vehicle data; transmit incremental learning related to the updated STP ML model to a cloud server; and receive, from the cloud server, a personalized setting for the driver output from another STP ML model trained by the incremental learning.

Figure 7:
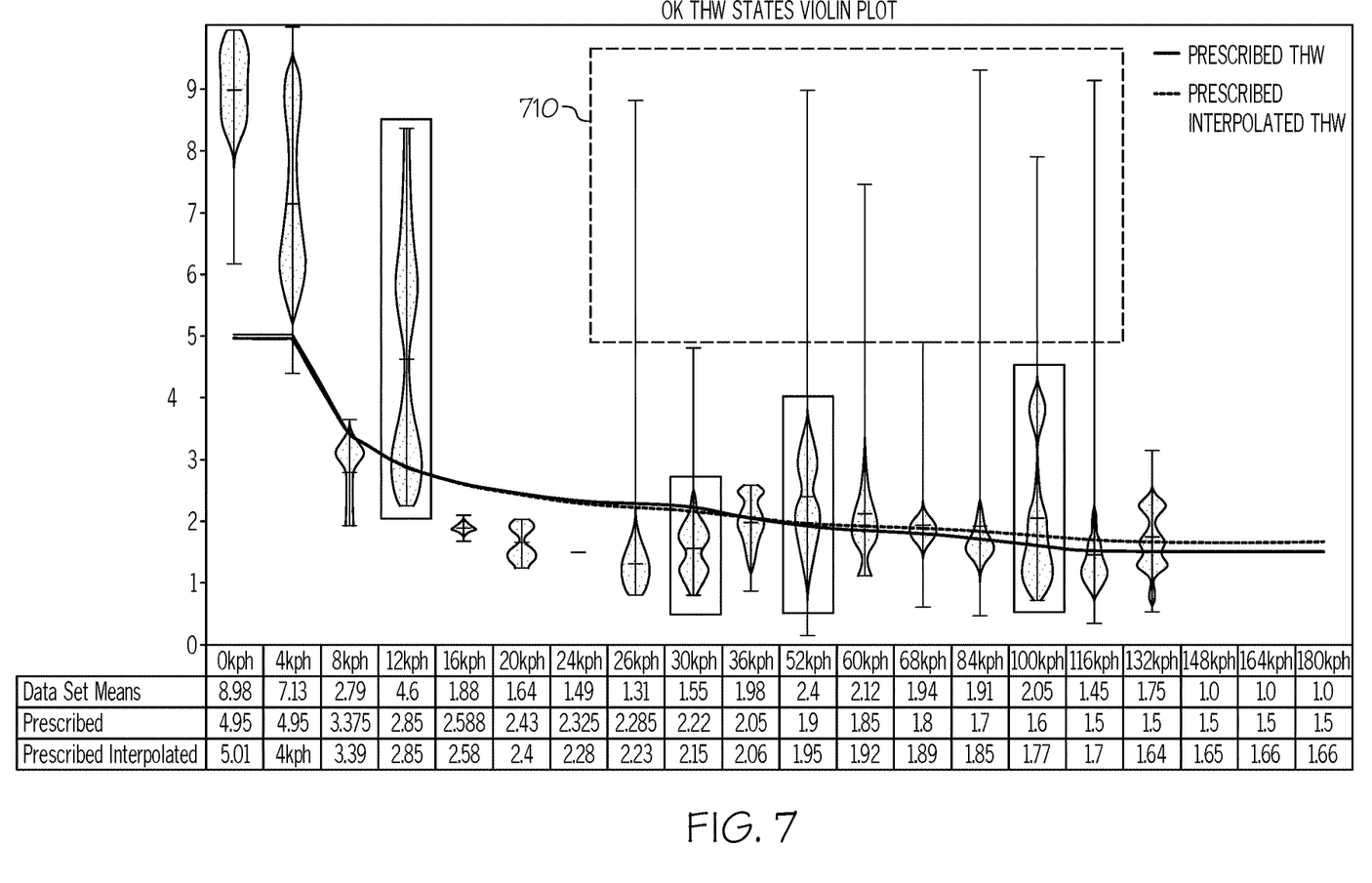
FIG. 7 depicts a graph illustrating outliers caught using a STP ML model, according to one or more embodiments shown and described herein.

The STP ML model provides several advantages over other ML models such as GP models. The STP ML model can get personalized data from a smaller set of data than the GP model. This helps build a vehicle-based model that works in conjunction with a cloud server to build a more accurate personalized parameter solution. The STP ML model may catch outliers that a GP ML model is unable to catch. FIG. 7 illustrates outliers 710 caught using a STP ML model that cannot be caught by a GP model. In real driving scenarios, drivers often override the cruise control system. For example, the drivers brake too soon or move too fast, and do not let the adaptive cruise control drive the car. According to statistics, drivers with adaptive cruise control on are about 24% more likely to be speeding on highways than those with the adaptive cruise control off. Such deviations would be considered extremely unlikely according to Gaussian Process, but it is not unlikely under STP. The present process improves the personalized adaptive cruise control in real-life driving situations where drivers often over-speed or brake suddenly and not letting the adaptive cruise control system work as intended.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a controller programed to:
collect a set of data related to a driver of the vehicle;
predict a driving setting for the driver using the set of data and an initial student-T process (STP) machine learning (ML) model;
generate an updated STP ML model based on the prediction of the driving setting as to the set of vehicle data;
transmit incremental learning related to the updated STP ML model to a server; and
receive, from the server, a personalized driving setting for the driver output from a cloud STP ML model trained by the incremental learning,
wherein the incremental learning comprises a machine learning algorithm to dynamically train the cloud STP ML model based on the initial STP ML model and the updated STP ML model.

2. The vehicle of claim 1, wherein the set of data comprises a velocity of the vehicle, a velocity of another vehicle preceding the vehicle, and a distance between the vehicle and the another vehicle.

3. The vehicle of claim 1, wherein the personalized driving setting for the driver is a personalized adaptive cruise control setting for the driver.

4. The vehicle of claim 1, wherein the controller is further programmed to determine an acceleration profile for the vehicle based on the personalized driving setting.

5. The vehicle of claim 1, wherein the controller is further programmed to update the personalized driving setting based on driving preferences by the driver.

6. The vehicle of claim 1, wherein the controller is further programmed to update the personalized driving setting based on driving conditions.

7. The vehicle of claim 6, wherein the driving conditions include at least one of weather information, a type of a road on which the vehicle is driving, a surface condition of the road on which the vehicle is driving, and a degree of traffic on the road on which the vehicle is driving.

8. The vehicle of claim 1, wherein the controller is configured to determine a target gap between the vehicle and a leading vehicle based on the personalized driving setting, a current gap between the vehicle and the leading vehicle, and a relative velocity between the vehicle and the leading vehicle.

9. The vehicle of claim 1, wherein the controller is further configured to operate the vehicle based on the personalized driving setting.

10. A method for generating a personalized driving setting using a student-T process (STP) machine learning (ML) model, the method comprising:
collecting a set of data related to a driver of a vehicle;
predicting a driving setting for the driver using the set of data and an initial STP ML model;
generating an updated STP ML model based on the prediction of the driving setting as to the set of vehicle data;
transmitting incremental learning related to the updated STP ML model to a server; and
receiving, from the server, a personalized driving setting for the driver output from a cloud STP ML model trained by the incremental learning,
wherein the incremental learning comprises a machine learning algorithm to dynamically train the cloud STP ML model based on the initial STP ML model and the updated STP ML model.

11. The method of claim 10, wherein the set of data comprises a velocity of the vehicle, a velocity of another vehicle preceding the vehicle, and a distance between the vehicle and the another vehicle.

12. The method of claim 10, wherein the personalized driving setting for the driver is a personalized adaptive cruise control setting for the driver.

13. The method of claim 10, further comprising determining an acceleration profile for the vehicle based on the personalized driving setting.

14. The method of claim 10, further comprising updating the personalized driving setting based on driving preferences by the driver.

15. The method of claim 10, further comprising updating the personalized driving setting based on driving conditions.

16. The method of claim 15, wherein the driving conditions include at least one of weather information, a type of a road on which the vehicle is driving, a surface condition of the road on which the vehicle is driving, and a degree of traffic on the road on which the vehicle is driving.

17. The method of claim 10, further comprising determining a target gap between the vehicle and a leading vehicle based on the personalized driving setting, a current gap between the vehicle and the leading vehicle, and a relative velocity between the vehicle and the leading vehicle.

18. A system for generating a personalized driving setting using an student-T process (STP) machine learning (ML) model, the system comprising a vehicle and a server, wherein:
the vehicle is programed to:
  collect a set of data related to a driver of the vehicle;
  predict a driving setting for the driver using the set of data and an initial STP ML model;
  generate an updated STP ML model based on the prediction of the driving setting as to the set of vehicle data; and
  transmit incremental learning related to the updated STP ML model to the server; and
the server is programed to:
  train a cloud STP ML model based on the incremental learning comprising a machine learning algorithm that dynamically trains the cloud STP ML model based on the initial STP ML model and the updated STP ML model; and
  transmit, to the vehicle, a personalized driving setting for the driver based on the trained cloud STP ML model.

19. The system of claim 18, wherein:
the set of data comprises a velocity of the vehicle, a velocity of another vehicle preceding the vehicle, and a distance between the vehicle and the another vehicle; and
the personalized driving setting for the driver is a personalized adaptive cruise control setting for the driver.

20. The system of claim 18, wherein the vehicle is further configured to determine a target gap between the vehicle and a leading vehicle based on the personalized driving setting, a current gap between the vehicle and the leading vehicle, and a relative velocity between the vehicle and the leading vehicle.

* * * * *

UNITED STATES PATENT AND TRADEMARK OFFICE
CERTIFICATE OF CORRECTION

PATENT NO. : 12,036,987 B2
APPLICATION NO. : 17/388488
DATED : July 16, 2024
INVENTOR(S) : Rohit Gupta et al.

It is certified that error appears in the above-identified patent and that said Letters Patent is hereby corrected as shown below:

On the Title Page

Column 2, item (57), abstract, Line(s) 1, delete "programed" and insert --programmed--, therefor.

In the Specification

In Column 1, Line(s) 41 & 42, delete "programed" and insert --programmed--, therefor.

In Column 1, Line(s) 66, delete "programed" and insert --programmed--, therefor.

In Column 2, Line(s) 5, delete "programed" and insert --programmed--, therefor.

In Column 3, Line(s) 9 & 10, delete "programed" and insert --programmed--, therefor.

In Column 11, Line(s) 8 & 9, delete "programed" and insert --programmed--, therefor.

In the Claims

In Column 11, Line(s) 60, Claim 1, delete "programed" and insert --programmed--, therefor.

In Column 13, Line(s) 20, Claim 18, delete "programed" and insert --programmed--, therefor.

In Column 14, Line(s) 3, Claim 18, delete "programed" and insert --programmed--, therefor.

Signed and Sealed this
Twenty-second Day of October, 2024

Katherine Kelly Vidal
*Director of the United States Patent and Trademark Office*